UNITED STATES PATENT OFFICE.

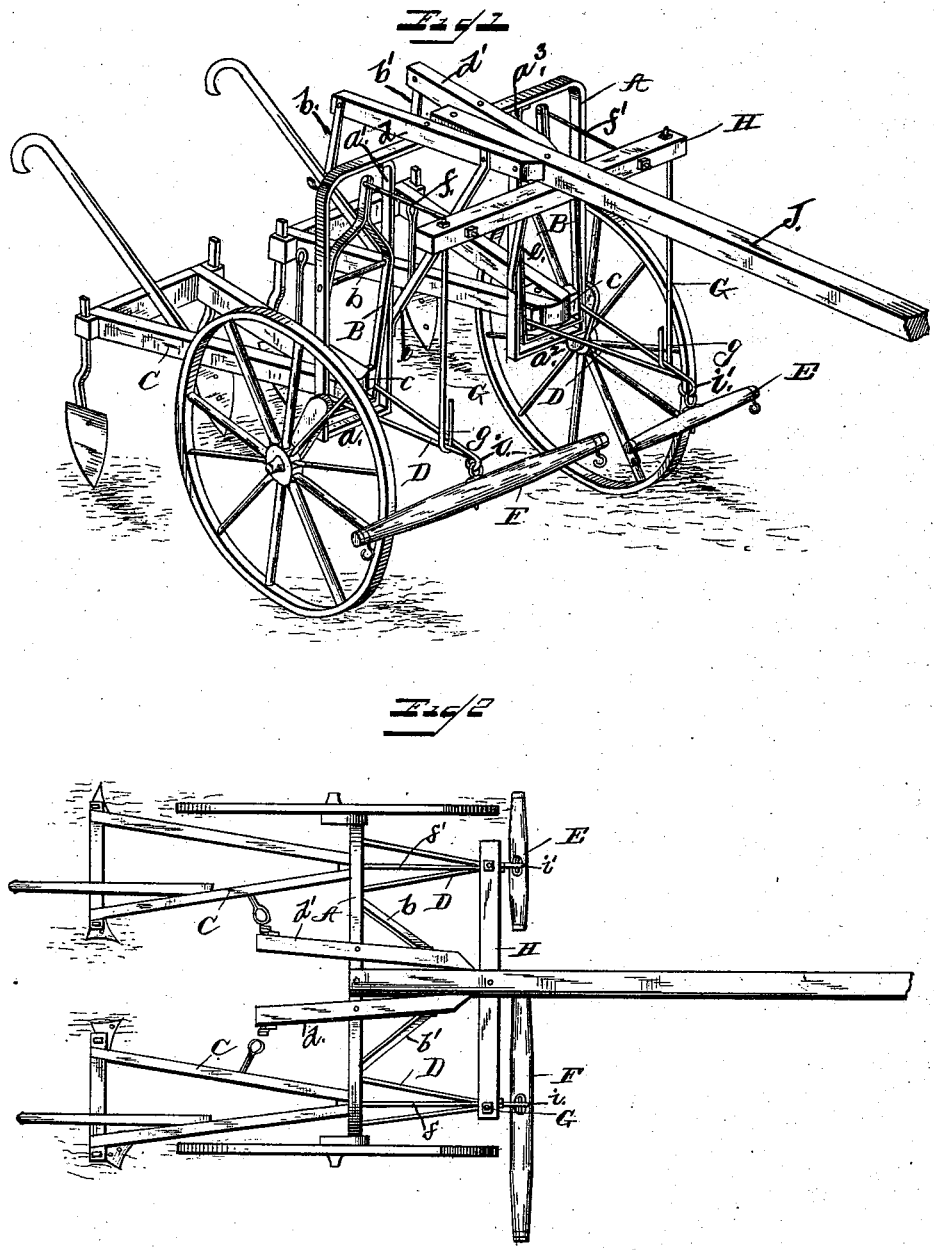

ALANSON HOWARD BALES, OF WASHINGTON, KANSAS.

DRAFT-EQUALIZER.

SPECIFICATION forming part of Letters Patent No. 377,978, dated February 14, 1888.

Application filed September 29, 1887. Serial No. 251,020. (No model.)

*To all whom it may concern:*

Be it known that I, ALANSON HOWARD BALES, a citizen of the United States, residing at Washington, in the county of Washington and State of Kansas, have invented certain new and useful Improvements in Draft-Equalizers for Tongue-Cultivators; and I do hereby declare the following to be a full, clear, and exact description of the invention, such as will enable others skilled in the art to which it appertains to make and use the same.

My invention relates to draft-equalizers for tongue-cultivators, &c.; and the object of my invention is to produce an equalizer or evener by means of which each animal will be enabled to perform his full share of work, and which shall avoid all downward draft upon the tongue of the machine.

To the above purposes my invention consists in the novel features of construction and arrangement, hereinafter described, and pointed out in the claims.

In order that my invention may be fully understood, I will proceed to describe it with reference to the accompanying drawings, in which—

Figure 1 is a perspective view of a cultivator with my improvements applied thereto. Fig. 2 is a plan view of the same.

In the accompanying drawings, the letter A indicates an arched bar provided with side and bottom portions, $a$ $a'$ $a^2$ $a^3$, forming with the side portion of the arched bar a rectangular frame, as shown in Fig. 1, for a purpose presently explained.

J represents the pole or tongue, which is connected to bar A and cross-beam H by any well-known means, and it is provided at its inner end with forked arms $d$ $d'$, having depending hooks $b$ $b'$, whereby the plow-beams C are swung from the ground when not in use.

$e$ $e'$ are braces connected at their upper ends to the forks $d$ $d'$, their lower ends being connected to the side portions, $a'$ $a^3$, of the arched bar A. At each end of the cross-beam H are secured depending rods G, having at their lower ends hooks $g$.

The letters B B denote the eveners, which are pivoted by a rod, $b$, to the rectangular frame of said arched bar A. Said eveners are provided at their upper ends with eyes, in which are connected the inner ends of rods $f$ $f'$, the opposite ends of said rods being connected to cross-beam H. Secured at one end to the lower ends of the eveners B are the beams C, said beams being provided with V-shaped arms D, arranged in pairs on each side of the beams. The rods are provided on their outer ends with hooks or eyes $i$ $i'$, with which to connect them with the trees E F. One of each of these V-shaped arms is detachably connected to the hooks $g$ of the depending arms G, which holds the eveners and prevents them from becoming twisted or otherwise thrown out of position.

It will be readily understood from the foregoing description of the construction and arrangement of the eveners that they will vibrate vertically when in use by means of their pivoted connections. It will also be seen that each animal works independently of the other, and that all strain upon the frame is avoided, as by my construction there can be no downward draft upon the pole or tongue.

Having described my invention, what I claim, and desire to secure by Letters Patent, is—

1. The combination of the arched axle A, having the rectangular frames formed therewith, the eveners pivoted in said frames, the cross-beam H, the hook-rods G D, connected together, said rods D made in V-shaped form, and the beams C, connected to rods D and to the eveners, as shown and described.

2. The combination of the arched bar having depending rectangular frames, the eveners pivoted within the frames and having connections to a cross-beam by means of rods at the top and bottom portions of said eveners, substantially as shown and described.

3. The combination, with an arched bar, A, having a depending rectangular frame, and the eveners B B, pivotally connected to said frame and carrying one end of each of the beams C, said beams having V-shaped rods D, of the cross-beam H, having depending rods G, with hook ends $g$, for supporting rods D, and the rods $f$ $f'$, connected to the upper end of the eveners, and also secured to the cross-beam H, as shown and described.

4. The combination, with the arch having rectangular frame, the tongue, and trees, of the evener-frame pivoted in the rectangular frame, the rods connecting the trees and equalizers, and the pendent loop-rods, said looped rods sustaining the trees and equalizers, as shown and described.

In testimony whereof I affix my signature in presence of two witnesses.

ALANSON HOWARD BALES.

Witnesses:
W. H. McComack,
G. H. Willis.